US008842833B2

(12) United States Patent
Natarajan

(10) Patent No.: US 8,842,833 B2
(45) Date of Patent: *Sep. 23, 2014

(54) SYSTEM AND METHOD FOR SECURE TRANSACTION OF DATA BETWEEN WIRELESS COMMUNICATION DEVICE AND SERVER

(75) Inventor: Vijayarangan Natarajan, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 340 days.

This patent is subject to a terminal disclaimer.

(21) Appl. No.: 13/117,009

(22) Filed: May 26, 2011

(65) Prior Publication Data

US 2012/0008775 A1    Jan. 12, 2012

(30) Foreign Application Priority Data

Jul. 9, 2010    (IN) .......................... 1976/MUM/2010

(51) Int. Cl.
*H04K 1/00* (2006.01)
*H04L 9/32* (2006.01)
*H04L 9/30* (2006.01)

(52) U.S. Cl.
CPC ...... *H04L 9/3271* (2013.01); *G06F 2207/7242* (2013.01); *H04L 9/3066* (2013.01); *H04L 9/3247* (2013.01); *H04L 2209/04* (2013.01); *H04L 2209/56* (2013.01); *H04L 2209/80* (2013.01)
USPC .......................................................... 380/274

(58) Field of Classification Search
None
See application file for complete search history.

(56) References Cited

U.S. PATENT DOCUMENTS

| 6,189,098 | B1 | 2/2001 | Kaliski, Jr. | |
| 6,563,928 | B1 | 5/2003 | Vanstone et al. | |
| 6,658,476 | B1 | 12/2003 | Van | |
| 7,243,232 | B2 | 7/2007 | Vanstone et al. | |
| 7,308,467 | B2 * | 12/2007 | Denk et al. | 708/250 |
| 7,716,482 | B2 | 5/2010 | Jung et al. | |
| 8,001,473 | B1 * | 8/2011 | Natkin | 715/723 |
| 2002/0016753 | A1 * | 2/2002 | Torii | 705/35 |
| 2006/0098819 | A1 | 5/2006 | Zeng et al. | |
| 2007/0189527 | A1 | 8/2007 | Brown et al. | |
| 2008/0044011 | A1 * | 2/2008 | Yoshida et al. | 380/28 |
| 2008/0313464 | A1 * | 12/2008 | Fascenda et al. | 713/171 |
| 2009/0180612 | A1 | 7/2009 | Leu et al. | |
| 2010/0031051 | A1 | 2/2010 | Machani et al. | |
| 2010/0325435 | A1 * | 12/2010 | Park et al. | 713/171 |
| 2011/0004760 | A1 * | 1/2011 | Sharaga et al. | 713/171 |

* cited by examiner

*Primary Examiner* — Farid Homayounmehr
*Assistant Examiner* — Olanrewaju Bucknor
(74) *Attorney, Agent, or Firm* — Schmeiser, Olsen & Watts LLP

(57) ABSTRACT

The present application provides a system and method for a set of Extensible Authentication Protocols (EAPs) based on ECC (Elliptic Curve Cryptography) and SKE (Symmetric Key Encryption) mechanisms (with a suitable permutation) that can serve Confidentiality, Authentication, Authorization and Accounting (CAAA) issues at an affordable cost. According to one embodiment, a method and system of ECC and SKE based EAPs (through a permutation technique) which can avoid replay attacks. The application also provides a light weight security with better performance in comparison to the lower layer chip level security provided by 2G, 3G or 4G Applications and no certificates exchanged during the communication.

15 Claims, 4 Drawing Sheets

SYSTEM AND METHOD FOR SECURE TRANSACTION OF DATA BETWEEN WIRELESS COMMUNICATION DEVICE AND SERVER

CROSS-REFERENCE TO RELATED APPLICATIONS AND PRIORITY

The present application claims priority to Indian Patent Application No. 1976/MUM/2010, filed on Jul. 9, 2010, the entirety of which is hereby incorporated by reference.

FIELD OF THE INVENTION

The present application relates to the field of wireless communications. Particularly, this application relates to a system and method for secure transaction of data between at least one wireless communication device and a server by using lightweight Extensible Authentication Protocols (EAPs) based on ECC (Elliptic Curve Cryptography) and SKE (Symmetric Key Encryption) mechanisms.

BACKGROUND

In the mobile and wireless communication, authentication methods are generally used to gain network access. The communication server (either for mobile or wireless) provides accessibility must have a set of processes and protocols to verify user's identity. There is a need of a standard way for verifying user's logon, monitoring user's network usage and customer billing. Currently there are standards and protocols that can fulfill the above criteria for Authentication, Authorization and Accounting (AAA) purposes. But some of them are not secure and their performance will not meet 3G mobile communication requirements.

The current mobile and wireless authentication mechanisms employ the usage of Certificates. The Authorization protocols must support some notion of a "charging certificate". These Certificates being heavy weight in size affect the performance of the Mobile Application. With the conservative standards set by many Institutions chiefly in the mobile banking sector there is a requirement for light weight protocols which help in ensuring optimum performance of mobile applications through wireless media.

Moreover, mobile and wireless devices, like smart phones, PDAs, cellular phones and Remote control systems, play an increasingly important role in the digital environment. The pervasive use of mobile and wireless devices brings new security and privacy risks and with the extensive use of mobile devices consumers continuously leave traces of their identities and transactions, sometimes even by just carrying the devices around in their pockets. Since providing true privacy is hard as hiding identity information is irrelevant as long as some other linkable information is associated with the messages, the usage of a light weight protocol will help provide effective solutions to a majority of mobile and wireless applications.

SUMMARY

Before the present systems and methods, enablement are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

The primary objective is to provide a system and method for a set of Extensible Authentication Protocols (EAPs) based on ECC (Elliptic Curve Cryptography) and SKE (Symmetric Key Encryption) mechanisms (with a suitable permutation) that can serve Confidentiality, Authentication, Authorization and Accounting (CAAA) issues at an affordable cost.

It is another significant objective to provide a method and system for a set extensible authentication protocols using ECC and SKE mechanisms. These protocols can be easily implemented into mobile and wireless communication devices. It is another objective to provide a method and system of ECC and SKE based EAPs (through a permutation technique) which can avoid replay attacks. It is another objective to provide a system and method for a lightweight and high speed certificateless extensible authentication protocols (EAPs), which occupy less memory space for storage, for mobile and wireless communications.

It is another objective to provide a certificateless extensible authentication protocols (EAPs) for mobile and wireless communications.

It is another objective to provide a securely transfer of registry and provision of consumer details over the communication network.

It is another objective to provide a light weight security with better performance in comparison to the lower layer chip level security provided by 2G, 3G or 4G applications.

It is another objective to provide a provision of two way authentication in comparison to the current one way authentication standards.

The present application uses ECC and SKE algorithms in the proposed EAP schemes. In the ECC as well SKE based EAPs, there is no certificates exchanged between wireless communication device and server. During the communication, a permutation technique (cubing a random number w.r.to a prime $p=2 \mod 3$)) is used between the wireless communication device and the server ends in order to avoid reply attack. The defined permutation: $r \rightarrow r^3 = r^3 \mod p$ (where $p=2 \mod 3$) is a bijective map employed as a crucial role in the proposed EAPs.

In one aspect, a system comprises a server and a wireless communication device is communicatively coupled with each other via communication network, wherein the communication network can be selected from the group of Wide area network (WAN), Local Area Network (LAN) or Metropolitan Area Networks (MAN), internet, intranet, etc. In a preferred embodiment, the communication network is internet. The wireless communication device can be selected from one of the group of mobile handsets, smart phones, PDAs, cellular phones, or tiny devices and the wireless communication device enabled with 2G, 3G, or 4G networks. In a preferred embodiment, the wireless communication device is mobile phone.

According to one embodiment, any one of the three lightweight Extensible Authentication Protocols (EAPs) can be used for performing authentication process to facilitate the wireless communication device prior to being allowed access to the server. The above said lightweight Extensible Authentication Protocols (EAPs) using any one of the ECC and SKE mechanisms (with a suitable permutation) that can serve Confidentiality, Authentication, Authorization and Accounting (CAAA) issues at an affordable cost.

BRIEF DESCRIPTION OF THE DRAWINGS

The foregoing summary, as well as the following detailed description of preferred embodiments, is better understood when read in conjunction with the appended drawings. There is shown in the drawings example embodiments, however, the application is not limited to the specific system and method disclosed in the drawings.

DETAILED DESCRIPTION

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

The Extensible Authentication Protocol (EAP) is an Internet standard that provides an infrastructure for network access clients and authentication servers (RFC 3748). It has applications in wireless networks and PPP connections. EAP does not specify the authentication mechanism itself but the way it is negotiated by the communicating parties. There are attacks due to no proper authentication protocols in EAP.

Accordingly, the present application provides a system and method for a set of Extensible Authentication Protocols (EAPs) based on ECC (Elliptic Curve Cryptography) and SKE (Symmetric Key Encryption) mechanisms (with a suitable permutation) that can serve Confidentiality, Authentication, Authorization and Accounting (CAAA) issues at an affordable cost.

The present application used ECC and SKE algorithms in the proposed EAP schemes. In the ECC as well SKE based EAPs, there is no certificates exchanged between wireless communication device and server. During the communication, a permutation technique (cubing a random number w.r.to a prime p=2 mod 3)) is used between the wireless communication device and the server ends in order to avoid reply attack. The defined permutation: $r \rightarrow r^3 = r^3 \mod p$ (where p=2 mod 3) is a bijective map employed as a crucial role in the proposed EAPs. There are three authentication protocols proposed below that will fulfill CAAA issues.

Figure 1:
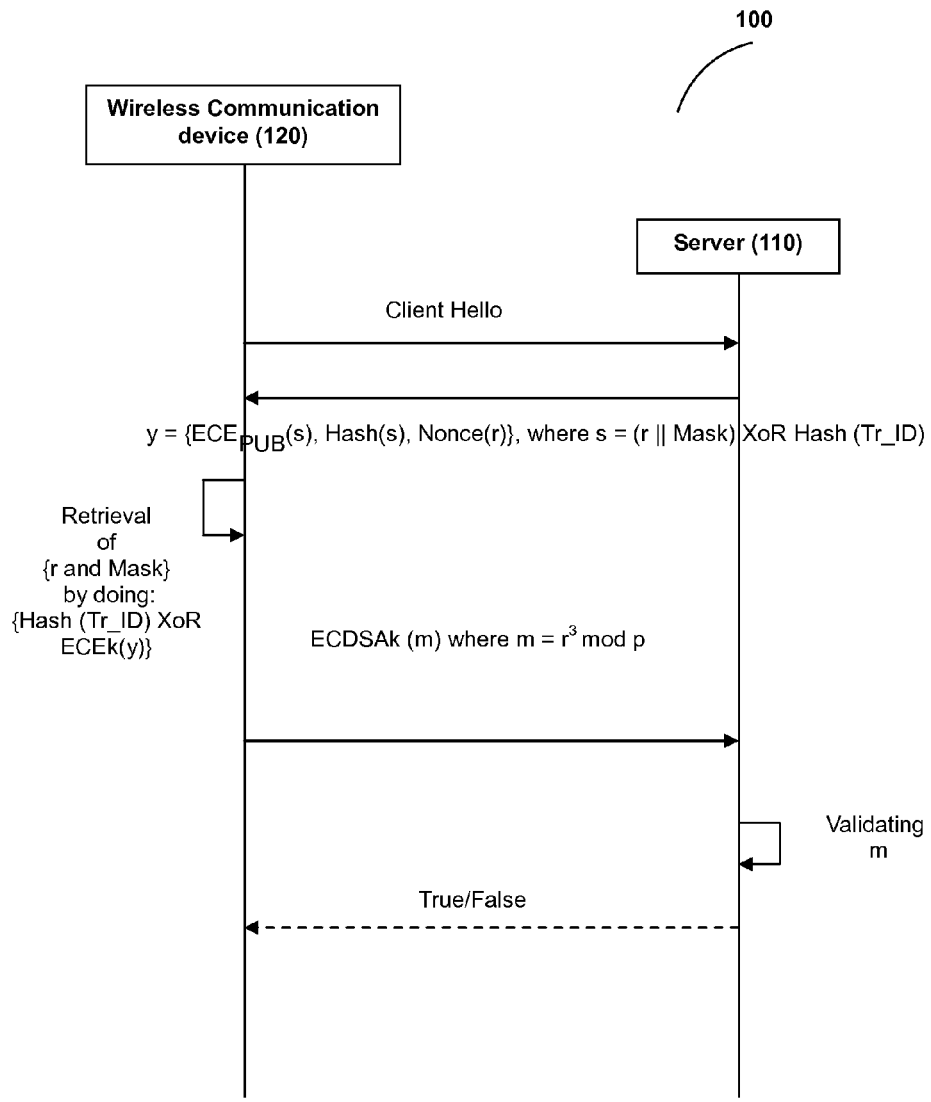
FIG. 1 illustrates the secure transaction of data using EAP Protocol based on ECC (Elliptic Curve Cryptography) mechanism between server and wireless communication device.

FIG. 1 illustrates the secure transaction of data using EAP Protocol based on ECC (Elliptic Curve Cryptography) mechanism between server and wireless communication device. A system 100 comprises a server 110 and a wireless communication device 120 is communicatively coupled with each other via communication network, wherein the communication network can be selected from the group of Wide area network (WAN), Local Area Network (LAN) or Metropolitan Area Networks (MAN), internet, intranet, etc. In a preferred embodiment, the communication network is internet. The wireless communication device 120 can be selected from one of the group of mobile handsets, smart phones, PDAs, cellular phones, or tiny devices and the wireless communication device enabled with 2G, 3G, or 4G networks. In a preferred embodiment, the wireless communication device 120 is mobile phone.

A method of communication used in the above said system 100 comprising receiving, from at least one wireless communication device 120, a connection attempt to access a server 110, performing an authentication process using lightweight Extensible Authentication Protocol (EAP) based on the Elliptic Curve Cryptography (ECC) mechanism to facilitate the wireless communication device 120 prior to being allowed access to the server 110, wherein the said authentication process comprising the following steps:

In the first step of the proposed method, the wireless communication device 120 initiates the communication by sending client hello message to the server 110, wherein the client hello message includes a list of encryption algorithms that the wireless communication device 120 is prepared to use and some challenge data to be used to authenticate the server 110. The message contains the following fields:

| CLIENT HELLO MESSAGE | |
|---|---|
| Field | Length |
| The message type (client hello) | 8 bits |
| The SSL version number (currently 2) | 16 bits |
| The length of the cipher list | 16 bits |
| The length of the session identifier | 16 bits |
| The length of the challenge data | 16 bits |
| The cipher list | variable |
| The session identifier | 16 ≤ data ≤ 32 bytes |
| The challenge data | variable |

The session identifier is used to match the current request with a previous one, avoiding the need for repeated authenticate and key exchange if two systems have frequent communication. When keys are selected the server 110 will cache these and, if the wireless communication device 120 provides a session identifier in the client hello message the server 110 will search the cache for this session identifier. According to one exemplary embodiment, the message contains the above mentioned fields as well as additionally 'buffer memory' field having the length of 32 bits. The field and length of the client hello message can be varied based on the requirements.

In the second step, the server 110 generates a random number 'r' upon receiving client hello message. According to one exemplary embodiment, the size of the random number 'r' is 100-bit. Then the server 110 computes a resultant masking process of random number $\{s=(r\|Mask) \text{ XoR Hash}(Tr\_ID)\}$ using the generated random number 'r', Mask, a transaction ID by matching hash function, wherein the Mask=156-bits. Subsequently the server 110 encrypts a message with the resultant masking process of random number 's' thereby matching hash function, adding a nonce value for security with help of a public key 'PUB' of the wireless communication device 120 using an ECE Encryption algorithm and then the server 212 sends the encrypted message $\{y=ECE_{PUB}(s), Hash(s), Nonce(r)\}$ to the wireless communication device 120.

In the third step, the wireless communication device 120 retrieves the random number 'r' and the Mask {Hash(Tr_ID) XoR ECE$_k$(y)} thereby matching hash function with help of a private key 'k' of the wireless communication device 120 upon receiving the encrypted message thereby using an ECE Decryption algorithm and subsequently the wireless communication device 120 splits the random number 'r' and the Mask and then subsequently verifies the values of the random number with the Nonce value for security and the resultant masking process of random number 's' with hash function.

In the fourth step, the wireless communication device 120 generates and adds the signature {signs} with message having a resultant value 'm', wherein the resultant value 'm' {m=r$^3$ mod p=a 137-bit number} is obtained using permutation technique of the random number 'r', with respect to its private key 'k' thereby using an ECDSA-163 algorithm and subsequently the wireless communication device 120 sends the resultant message {sig_value} to the server 110.

In the fifth step, the server 110 verifies the signature {sig_value} of the received resultant message with help of the public key 'PUB' of the wireless communication device 120 using ECDSA-163 algorithm and subsequently the server 110 retrieves the resultant value 'm' {r3 mod p} by using permutation technique of the random number 'r'.

In the final step, the server 110 sends the response upon verifying the signature of the received resultant message to the wireless communication device 120.

Before initiating the communication in the above said system 100, initially, the server 110 registers the device and IMEI numbers of the wireless communication device 120 and then distributing customer identity and transaction identity (Cust_ID and Tr_ID) to each wireless communication devices 120 prior to being allowed access to the server 110.

According to one exemplary embodiment, the wireless communication device 120 is mobile phone. Accordingly, the server 110 registers mobile and IMEI numbers and distributes customer identity and transaction identity (Cust_ID and Tr_ID) to each mobile 120 prior to being allowed access to the server 110. The wireless communication device 120 uses its private key 'k' of 163-bits for Elliptic Cryptography (EC) decryption and EC signature generation and uses its public key 'PUB' for Elliptic Cryptography (EC) decryption and EC signature verification and a known Pseudo Random Number Generator (PRNG) which accepts a seed for generating the random numbers.

According to one embodiment, before initiating the communication in the above said system 100, initially an (Elliptic Curve Cryptography) ECC-163 set up is arranged between the wireless communication device and the server.

Example of the Secure Transaction of Data Using EAP Protocol Based on ECC (Elliptic Curve Cryptography) Mechanism:

1. Tr_ID=35422
2. Hash(Tr_ID)=95405401234511
3. Prime number p=101 where p is 2 mod 3
4. Wireless communication device's private key k=199
5. Wireless communication device's public key PUB= (232, 123)
6. Server generates a random number r=124325
7. Server computes s=1243255783459321 XoR 95405401234511=1192391475877302, where Mask=5783459321.
8. Server uses PUB and sends {(23241, 34343), 3443221, 15} to the wireless communication device
9. Wireless communication device uses k on (23241, 34343) using EC Decryption and gets s from which the wireless communication device retrieves r=124325.
10. Wireless communication device computes m=r$^3$ mod p=87, signs m w.r.to k using ECDSA-163 algorithm and sends the sig_value={4547, 3434} to the server.
11. Server computes m=r$^3$ mod p=87 and uses the public key of client for verifying the signature.

Figure 2:
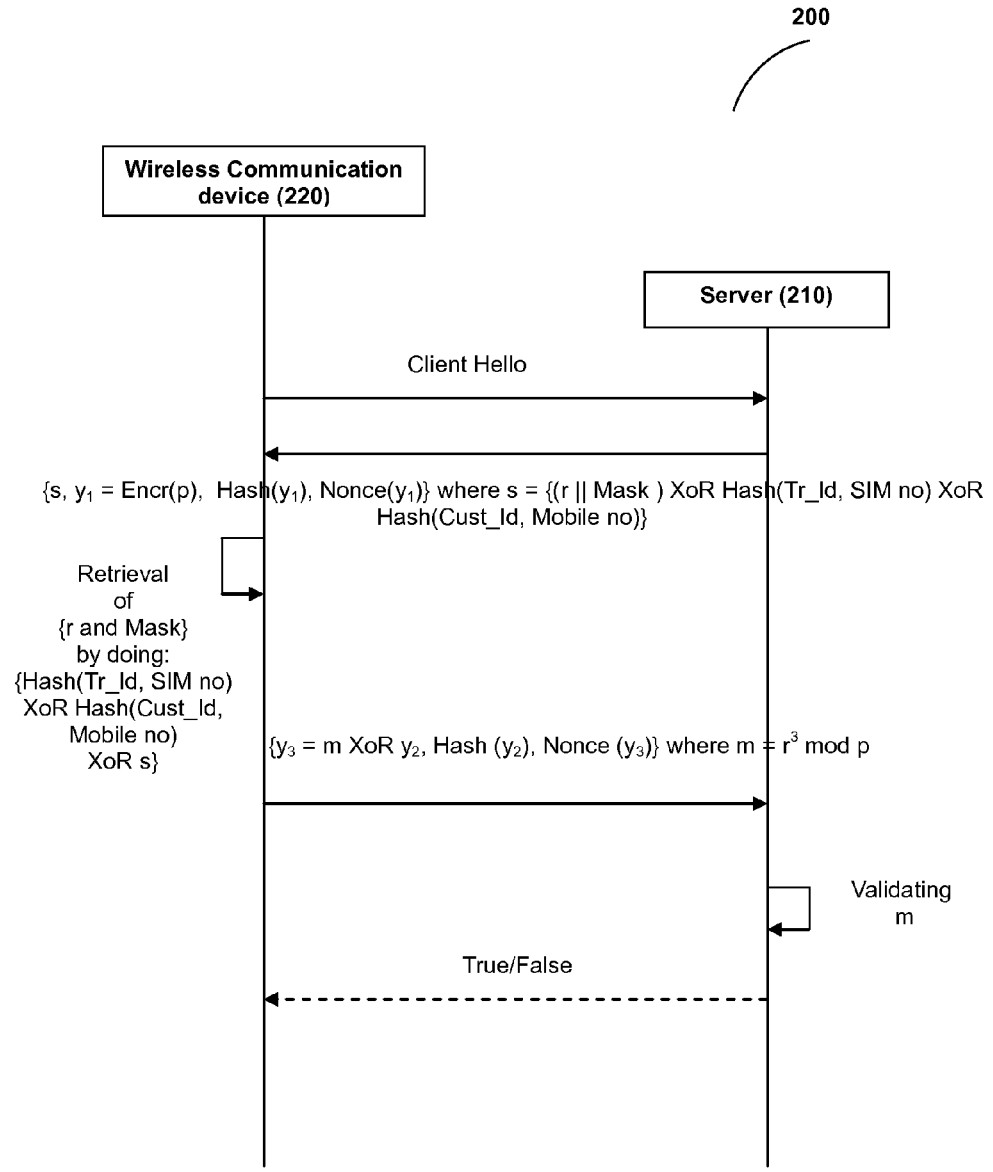
FIG. 2 illustrates the secure transaction of data using EAP Protocol based on SKE (Symmetric Key Encryption) mechanism-1 between server and wireless communication device.

FIG. 2 illustrates the secure transaction of data using EAP Protocol based on SKE (Symmetric Key Encryption) mechanism-1 between server and wireless communication device. A system 200 comprises a server 210 and a wireless communication device 220 are communicatively coupled with each other via communication network, wherein the communication network can be selected from the group of Wide area network (WAN), Local Area Network (LAN) or Metropolitan Area Networks (MAN), internet, and intranet, etc. In a preferred embodiment, the communication network is internet. The wireless communication device 220 can be selected from one of the group of mobile handsets, smart phones, PDAs, cellular phones, or tiny devices and the wireless communication device enabled with 2G, 3G, or 4G networks. In a preferred embodiment, the wireless communication device 220 is mobile phone.

A method of communication used in the above said system 200 comprising receiving, from at least one wireless communication device 220, a connection attempt to access a server 210, performing an authentication process using lightweight Extensible Authentication Protocol (EAP) based on the Symmetric Key Encryption (SKE) mechanism to facilitate the wireless communication device 220 prior to being allowed access to the server 210, wherein the said authentication process comprising the following steps:

In the first step of the proposed method, the wireless communication device 220 initiates the communication by sending client hello message to the server 210, wherein the client hello message includes a list of encryption algorithms that the wireless communication device 220 is prepared to use and some challenge data to be used to authenticate the server 210. The message contains the following fields:

| CLIENT HELLO MESSAGE | |
|---|---|
| Field | Length |
| The message type (client hello) | 8 bits |
| The SSL version number (currently 2) | 16 bits |
| The length of the cipher list | 16 bits |
| The length of the session identifier | 16 bits |
| The length of the challenge data | 16 bits |
| The cipher list | variable |
| The session identifier | 16 ≤ data ≤ 32 bytes |
| The challenge data | variable |

The session identifier is used to match the current request with a previous one, avoiding the need for repeated authenticate and key exchange if two systems have frequent communication. When keys are selected the server 210 will cache these and, if the wireless communication device 220 provides a session identifier in the client hello message the server 210 will search the cache for this session identifier. According to one exemplary embodiment, the message contains the above mentioned fields as well as additionally 'buffer memory' field having the length of 32 bits. The field and length of the client hello message can be varied based on the requirements.

In the second step, the server 210 generates a random number 'r' upon receiving client hello message and prime number 'p' (=2 mod 3). According to one exemplary embodiment, the size of the random number 'r' is 192-bit and the size of the prime number 'p' is 64-bit. Subsequently the server 210 computes a resultant masking process of random number $\{s=(r\|Mask)$ XoR Hash(Tr_Id, SIM no) XoR Hash(Cust_Id, Mobile no)$\}$ using the generated random number 'r', Mask, a transaction ID, Customer ID, Device Number by matching hash function, a nonce value for security, wherein the Mask=64-bits. The server 210 encrypts a message with the resultant masking process of random number 's', a resultant masking value 'y1' using hash function, further adding a nonce value for security and then the server 210 sends the encrypted message $\{s, y_1=Enc_r(p), Hash(y_1), Nonce(y_1)\}$ to the wireless communication device 220.

In the third step, the wireless communication device 220 retrieves the random number 'r' and the Mask $\{Hash(Tr\_Id, SIM no)$ XoR Hash(Cust_Id, Mobile no) XoR s$\}$ by matching hash function upon receiving the encrypted message and subsequently the wireless communication device 220 splits the Mask and the random number 'r' which is used to decrypt the $\{y_1\}$, upon recovering the prime number 'p', verifies the hash value of the received resultant masking value $\{Hash(y_1)\}$. Then the wireless communication device 220 computes a resultant value $\{r^3=(r \bmod p)^3 \bmod p\}$, which is obtained using permutation technique of the random number and subsequently the wireless communication device 220 encrypts a message $\{y_3=r^3 \text{ XoR } y_2, Hash(y_2), Nonce(y_3)\}$ with a new second random number $y_2$ by matching hash function and further adding a nonce value for security and then the wireless communication device 220 sends the resultant encrypted message to the server 210, wherein the second new random number '$y_2$' is generated using the Pseudo Random Number Generator (PRNG) method.

In the fourth step, the server 210 computes a cubing value of the random number $\{r^3\}$ and subsequently the server 210 gets the second new random number $\{'y_2'$ by $y_3$ XoR $r^3\}$ using the cubing value of the random number and XOR function and then the server 210 verifies the hash value of the received message $\{Hash(y_2)\}$ and Nonce value of the received resultant encrypted message $\{Nonce(y_3)\}$.

In the final step, the server 210 sends the response upon verifying hash value of the received message $\{Hash(y_2)\}$ and Nonce value of the received resultant encrypted message $\{Nonce(y_3)\}$ to the wireless communication device 220.

Before initiating the communication in the above said system 200, initially, the server 210 registers the device and IMEI numbers of the wireless communication device 220 and then distributing customer identity and transaction identity (Cust_ID and Tr_ID) to each wireless communication devices 220 prior to being allowed access to the server 210.

According to one exemplary embodiment, the wireless communication device 220 is mobile phone. Accordingly the server 210 registers mobile and IMEI numbers and distributes customer identity and transaction identity (Cust_ID and Tr_ID) to each mobile 220 prior to being allowed access to the server 210 and subsequently the server 210 uses AES-CTR-192-bit algorithm for encrypting a message and a known Pseudo Random Number Generator (PRNG) which accepts a seed for generating the random numbers.

Example of the Secure Transaction of Data Using EAP Protocol Based on SKE (Symmetric Key Encryption) Mechanism-1:

1. Cust_ID=2323; Tr_ID=3542234
2. Mobile no=9885076432; IMEI=74398483299329
3. Hash(Tr_ID, SIM no)=12495405401234511; Hash (Cust_ID, Mobile no)=232311212121
4. Server generates a 192-bit random number r=12432534343 and a 64-bit prime no p=101 where p is 2 mod 3
5. Server computes r$\|$Mask=124325343435783459321 and s=66391475877301.
6. Server uses r to find $Enc_r(p)$=43484349 and sends $\{124330942610003772911, 43484349, 232321, 14\}$ to the wireless communication device
7. Wireless communication device retrieves r$\|$Mask=124325343435783459321 by
   Hash (Tr_ID, SIM no) XoR Hash(Cust_ID, Mobile no) XoR s and splits r=12432534343 and Mask=5783459321.
8. Wireless communication device computes $r^3=r^3 \bmod p$=41, generates a random number $y_2$=145 and sends (184, 343435, 4) to the server, where Hash (145)=343435.
9. Server computes $r^3=r^3 \bmod p$=41, gets $y_2$=145 by $y_3$ XoR $r^3$ and verifies Hash($y_2$) and Nonce($y_3$).

Figure 3:
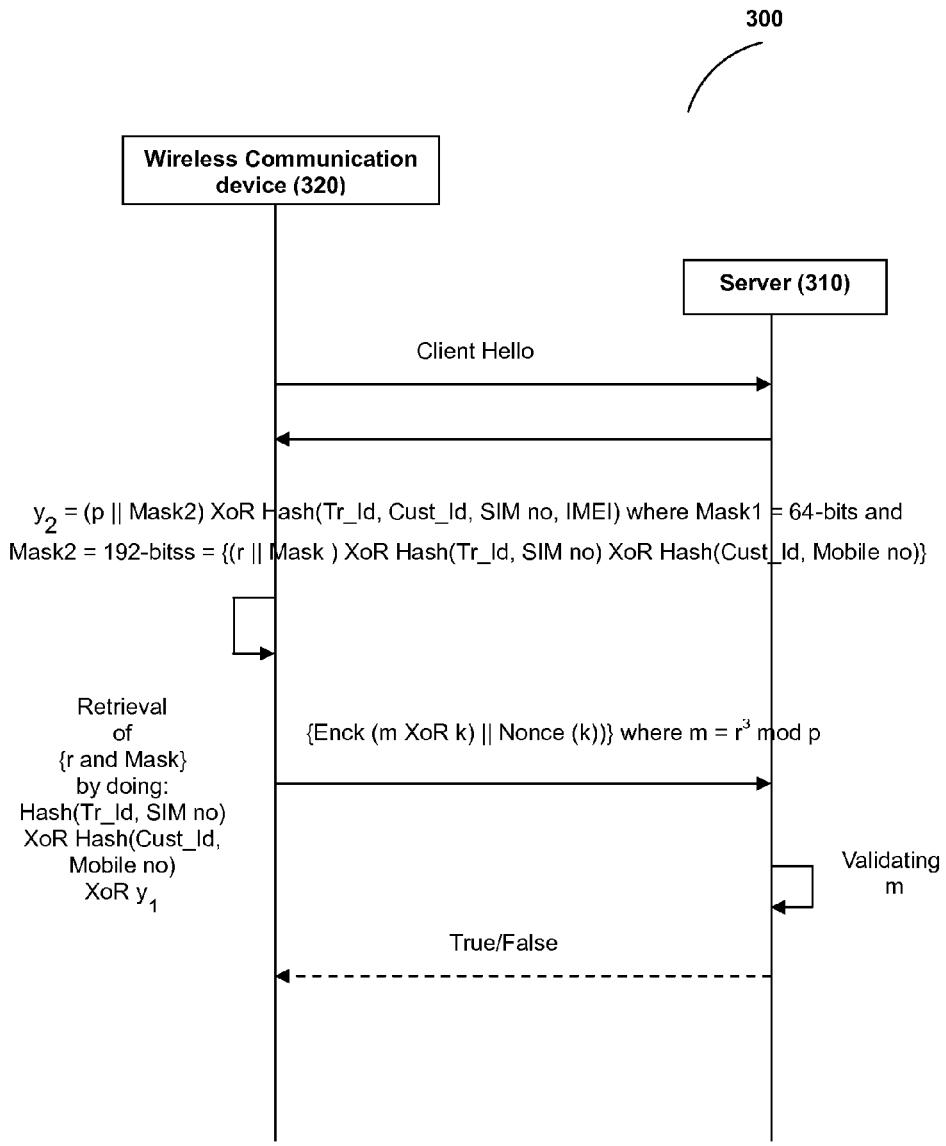
FIG. 3 illustrates the secure transaction of data using EAP Protocol based on SKE (Symmetric Key Encryption) mechanism-2 between server and wireless communication device.

FIG. 3 illustrates the secure transaction of data using EAP Protocol based on SKE (Symmetric Key Encryption) mechanism-2 between server and wireless communication device. A system 300 comprises a server 310 and a wireless communication device 320 are communicatively coupled with each other via communication network, wherein the communication network can be selected from the group of Wide area network (WAN), Local Area Network (LAN) or Metropolitan Area Networks (MAN), internet, and intranet, etc. In a preferred embodiment, the communication network is internet. The wireless communication device 320 can be selected from one of the group of mobile handsets, smart phones, PDAs, cellular phones, or tiny devices and the wireless communication device enabled with 2G, 3G, or 4G networks. In a preferred embodiment, the wireless communication device 320 is mobile phone.

A method of communication used in the above said system 300 comprising receiving, from at least one wireless communication device 320, a connection attempt to access a server 310, performing an authentication process using lightweight Extensible Authentication Protocol (EAP) based on the Symmetric Key Encryption (SKE) mechanism to facilitate the wireless communication device 320 prior to being allowed access to the server 310, wherein the said authentication process comprising the following steps:

In the first step of the proposed method, the wireless communication device 320 initiates the communication by sending client hello message to the server 310, wherein the client hello message includes a list of encryption algorithms that the wireless communication device 320 is prepared to use and some challenge data to be used to authenticate the server 310. The message contains the following fields:

| CLIENT HELLO MESSAGE | |
| --- | --- |
| Field | Length |
| The message type (client hello) | 8 bits |
| The SSL version number (currently 2) | 16 bits |
| The length of the cipher list | 16 bits |
| The length of the session identifier | 16 bits |
| The length of the challenge data | 16 bits |

-continued

CLIENT HELLO MESSAGE

| Field | Length |
|---|---|
| The cipher list | variable |
| The session identifier | 16 ≤ data ≤ 32 bytes |
| The challenge data | variable |

The session identifier is used to match the current request with a previous one, avoiding the need for repeated authenticate and key exchange if two systems have frequent communication. When keys are selected the server 310 will cache these and, if the wireless communication device 320 provides a session identifier in the client hello message the server 310 will search the cache for this session identifier. According to one exemplary embodiment, the message contains the above mentioned fields as well as additionally 'buffer memory' field having the length of 32 bits. The field and length of the client hello message can be varied based on the requirements.

In the second step, the server 310 generates a random number 'r' upon receiving client hello message and prime number 'p' (=2 mod 3). According to one exemplary embodiment, the size of the random number 'r' is 192-bit and the size of the prime number 'p' is 64-bit. Subsequently the server 310 computes first resultant masking value $\{y_1=(r\|Mask1)$ XoR Hash(Tr_Id, SIM no) XoR Hash(Cust_Id, Mobile no)$\}$ using the generated random number by matching hash function, Mask1 and other parameters, wherein the Mask=64-bits, then computes second resultant masking value $\{y_2=(p\|Mask2)$ XoR Hash(Tr_Id, Cust_Id, SIM no, IMEI)$\}$ using generated random number by matching hash function, Mask2 and other parameters, wherein the Mask=64-bits; subsequently the server 310 encrypts a message with the first resultant masking value $y_1$ and the prime number by matching hash function and adding a nonce value for security, second resultant masking value $y_2$ and then the server 310 sends the encrypted message $\{y1, y2, Hash(y1\|p), Nonce(y1)\}$ to the wireless communication device 320.

In the third step, the wireless communication device 320 retrieves the random number 'r' and the Mask1 $\{Hash(Tr\_Id, SIM no)$ XoR Hash(Cust_Id, Mobile no) XoR y1$\}$ by matching hash function upon receiving the encrypted message and subsequently the wireless communication device 320 splits the Mask1 and the random number 'r'. Similarly, the wireless communication device 320 upon extracting the prime number 'p', then verifies hash value of the first resultant masking value $y_1$ with the extracted prime number 'p' $\{Hash(y1\|p)\}$, Nonce function with the first resultant masking value $y_1$, $\{Nonce(y_1)\}$, then the wireless communication device 320 computes a resultant value $\{r^3=(r \bmod p)^3 \bmod p\}$, which is obtained using permutation technique of the random number, then generates a 102-bit private key "k" using the Deterministic Random Sequence Generation (DRSG) algorithm DRSG(r, $t_1$, $t_2$) where $t_1=0$ and $t_2=Nonce(r^3)$. Then the wireless communication device 320 encrypts a message $\{Enc_k (r^3 XoR k)\|Nonce(k))\}$ with the cubing value of the random number and further adding a nonce value for security and then the wireless communication device 320 sends the resultant encrypted message to the server 310.

In the fourth step, the server 310 retrieves the private key 'k' by cubing value of the random number $\{r^3\}$ and subsequently the server 310 gets a resultant value, which is obtained from XOR function of the private key 'k' of the wireless communication device 320 with cubing value of the random number $\{r^3\}$ through decryption, then the server 310 splits the cubing value of the random number $\{r^3\}$ and the private key 'k'. Subsequently the server 310 verifies the private key with Nonce value for security $\{Nonce (k)\}$ from the received encrypted message.

In the final step, the server 310 sends the response upon verifying the private key with Nonce value for security $\{Nonce (k)\}$ from the received encrypted message to the wireless communication device 320.

Before initiating the communication in the above said system 300, initially, the server 310 registers the device and IMEI numbers of the wireless communication device 320 and then distributing customer identity and transaction identity (Cust_ID and Tr_ID) to each wireless communication devices 320 prior to being allowed access to the server 310.

According to one exemplary embodiment, the wireless communication device 320 is mobile phone. Accordingly, the server 310 registers mobile and IMEI numbers and distributes customer identity and transaction identity (Cust_ID and Tr_ID) to each mobile 320 prior to being allowed access to the server 310 and subsequently the server 310 uses AES-CTR-192-bit algorithm for encrypting a message and a known Pseudo Random Number Generator (PRNG) which accepts a seed for generating the random numbers.

Example of the Secure Transaction of Data Using EAP Protocol Based on SKE (Symmetric Key Encryption) Mechanism-2:

1. Cust_ID=2323; Tr_ID=3542234
2. Mobile no=9885076432; IMEI=74398483299329
3. Hash(Tr_ID, SIM no)=12495405401234511; Hash (Cust_ID, Mobile no)=232311212121; Hash(Tr_ID, Cust_ID, SIM no, IMEI)=34343421122
4. Prime number p=101 where p is 2 mod 3
5. Server generates a random number r=124325, Mask1=5783459 and Mask2=53434116432
6. Server computes $y_1$=32423423 and $y_2$=43556121
7. Server sends {32423423, 43556121, 1343444, 15}
8. Wireless communication device retrieves 1243255783459 by doing Hash(Tr_Id, SIM no) XoR Hash(Cust_Id, Mobile no) XoR $y_1$ and finds r=124325 and Mask1=5783459
9. Server uses k to find $Enc_k(s)$=43434343 and sends {66391475877301, 43434343, 232321, 18} to the wireless communication device.
10. Wireless communication device uses k to get s and finds r=124325 and Mask=5783459321 by Hash (Tr_ID, SIM no) XoR Hash (Cust_ID, Mobile no) XoR s.
11. Wireless communication device computes $r^3=r^3$ mod p=87, generates $y_2$=145 and sends (198, 343434, 4} to the server.
12. Server computes $r^3=r^3$ mod p=87, gets $y_2$=145 by $y_3$ XoR $r^3$ and verifies Hash($y_2$) and Nonce($y_3$).

According to one embodiment, the hash function is matched, in the above proposed systems and methods in order to maintain a secure communication to avoid phishing and replay attacks and according to another embodiment, the nonce value is added, in the above mentioned systems and methods in order to maintain a secure communication to avoid phishing and replay attacks. Further, hashing and nonce methods are used to avoid Initial Counter Prediction and Time Memory Trade Off attacks.

Strengths of EAP Protocol Based on ECC (Elliptic Curve Cryptography) and SKE (Symmetric Key Encryption) Mechanisms:

1. From Base station to GPRS core network via Network subsystems, our EAP (Protocol 1: EAP based on ECC mechanism) works in a speedy manner due to the usage of ECC-163 bits between the nodes.

2. In the protocol 1(EAP based on ECC mechanism), it is difficult to generate a signed message by an attacker; since the permutation
3. $r \rightarrow r^3 = r^3 \mod p$ (where $p = 2 \mod 3$) is random.
4. Similarly, it is difficult to predict a random number r (supplied by the server) in protocols 1, 2 and 3 (EAPs based on ECC mechanism and SKE mechanisms 1 & 2); since the mapping $r \rightarrow r^3 = r^3 \mod p$ is bijective.
5. The protocols (EAPs based on ECC mechanism and SKE mechanisms 1 & 2) are compatible to 2G, 3G or 4G mobile networks.
6. No key agreement between different domains and key expiration are not there in our protocols (EAPs based on ECC mechanism and SKE mechanisms 1 & 2).
7. EAPs are suitable for WLANs and WMANs and are better than the existing EAPs which are vulnerable to a number of attacks—dictionary attack, plain text attack, chosen plain text attack, even man in the middle attack.

The application is described in the example given below which is provided only to illustrate the application and therefore should not be construed to limit the scope of the application.

Requirements:
EAP Application Environment is as mentioned below:
a) Software Environment

TABLE 1

| Operating System | Windows XP/2003 SP3 |
|---|---|
| Software/Tools | WTK2.5.2, Log4Net | b) Hardware Environment

TABLE 2

| Workstation Client | Windows XP with SP3 |
|---|---|
| Test Server | 4 GB RAM, Intel Core 2 vPro 160 GB HDD, E6550 as processor |
| Mobile | J2ME enabled Mobile with GPRS connectivity. |

Initial Test Set-Up
EAP Client:
1) Basically EAP client will Installed in Mobile devices (for e.g. Nokia N79, E75, 5800-ExpressMusic, 6210 Navigator).
2) It is a J2ME Code which will do the encryption & decryption of data.
3) It will contact the server and communicate through a secure channel.
b) EAP Server:
1) A server application built using .NET framework, which is used for decryption & encryption of data.
2) Decrypts the Client request and send the response back in encrypted format.

EAP Application Flow Diagram with Performance

Figure 4:
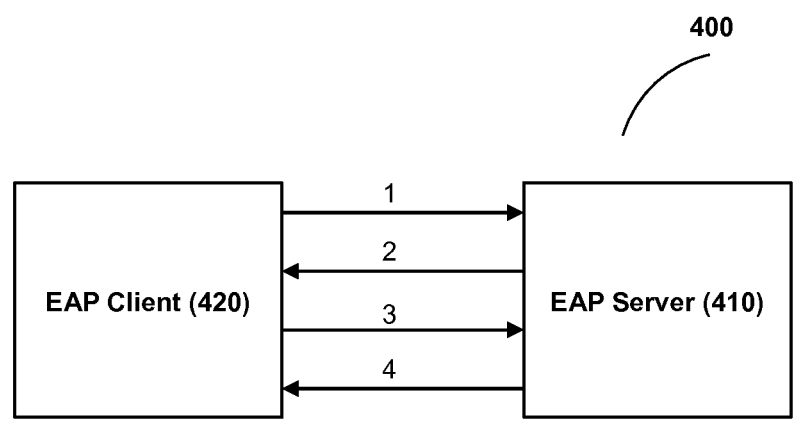
FIG. 4 illustrates flow diagram with performance by using lightweight EAP Protocols for secure transaction of data between wireless communication device and server.

FIG. 4 illustrates flow diagram with performance 400 by using lightweight EAP Protocols for secure transaction of data between wireless communication device and server. In the first step, client 420 initiates the communication by sending client hello message to the server 410 {1→ClientInitiate( )-request}. In the second step, the server 410 sends hexadecimal sequence as a response upon receiving the client hello message from the client 420 {2→Hexa decimal sequence(response)}. In the third step, the client 420 sends request message using the EAP protocol to server 410 for initiating secure transaction of data between them {3→EAP Protocol( )-request}. In the fourth step, the server 410 sends the response upon validating the protocol to the client 420 {4→true/false (response). In the final step, if the response is 'true" then the secure transaction of data process starts between the client and the server, otherwise, the response is 'false", the communication ends between them.

Test Results:
Nokia handset series N79, E75, 5800 and 6210 support these EAP Client modules. As per the performance, Nokia has done 'EAP flow' and the server checks the authentication response in <0.5 ms. This is a remarkable performance compared to certificate based transactions where the authentication response from server end takes >1 sec.

The above proposed systems and methods find a number of applications in Mobile and Wireless communications. Some specific areas where our process can be applied are as follows: Smart phones, Personnel Digital Assistant (PDA), Mobile banking, Wireless devices, Set-Top Box, Remote control systems, Alarm systems and Mobile-to-mobile payment systems, etc.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g. liquid crystal display (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium can be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: tangible media; solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle and scope.

I claim:

1. A method of authenticating a wireless communication device for secure transaction of data between a communication device and a server, the method comprising the steps of:
   receiving, by the server, a first message transmitted by the communication device, the first message comprising challenge data to authenticate the server;
   generating a random number by the server;
   computing, by the server, a masking process of the random number using the random number, a mask, and other parameters;
   generating, by the server, a first encrypted message using the masking process and a nonce value for security;
   transmitting, by the server, the first encrypted message to the communication device;
   decrypting, by the communication device, the first encrypted message in order to retrieve the random number;
   generating, by the communication device, a second message by cubing the random number and performing a modulo operation therewith of a prime number and further using a private key of the communication device;
   generating, by the communication device, a second encrypted message by adding a signature to the second message;
   transmitting, by the communication device, the second encrypted message to the server;
   verifying, by the server, the signature of the second message using a public key of the communication device;
   retrieving the second message by cubing the random number and performing the modulo operation therewith of the prime number;
   generating a response based on the verification and the retrieval; and transmitting the response to the communication device by the server.

2. The method of claim 1, wherein generating the first encrypted message comprises using a public key and a hash function of the masking process.

3. The method of claim 1, wherein encrypting the second signal by bundling a third message with a signature signal generating the second encrypting message is associated with a private key of the communication device.

4. A method of authenticating a wireless communication device for secure transaction of data between at least one communication device and a server, the method comprising the steps of:
   receiving, by the server, a first message transmitted by the communication device, the first message comprises challenge data to authenticate the server;
   generating, by the server, a first random number and a prime number at the server;
   computing, by the server, masking process using the first random number, a mask, a nonce value for security, and other parameters;
   generating, by the server, a first encrypted message using the masking process, a masking value produced using a hash function, a nonce value for security, and the prime number;
   transmitting, by the server, the first encrypted message to the communication device;
   decrypting, by the communication device, the first encrypted message in order to retrieve the first random number and the mask;
   generating, by the communication device, a second encrypted message by using
   a hash function of a second random number (y2),
   a nonce value for security, and XoRing a cube of the first random number and y2, wherein cube of the first random number is equal to $[(r \bmod p)^3 \bmod p]$, and wherein p is a prime number;

transmitting, by the communication device, the second encrypted message to the server;

computing, by the server, the second random number by XoRing the second encrypted message with a cube of the first random number;

verifying, by the server, a hash value of the second random number and nonce value of the second encrypting message;

generating, by the server, a response based on the verification; and transmitting, by the server, the response to the communication device by the server.

5. The method of claim 4, further comprising transmitting a 192-bit pre-shared private (encryption) key from the server to the communication device using an AES-CTR algorithm.

6. The method of claim 4, wherein the second random number is generated using a Pseudo Random Number Generator (PRNG) method.

7. The method of claim 4, wherein the second encrypted message is generating by bundling a third message with at least one of the hash value associated with the second random number and nonce value associated with a private key, the said private key is generated using a Deterministic Random Sequence Generation (DRSG) process.

8. The method of claim 4, wherein decrypting the second encrypted signal message includes retrieving a private key.

9. The method of claim 4, wherein validating the second encrypted signal message by comparing either one of the corresponding value of hash value associated with the second random number or nonce values associated with the private key of the communication device.

10. A system for secure transaction of data between at least one communication device and a server, the system authenticating a wireless communication device, comprising:

the communication device for generating a first message comprising challenge data to authenticate the server;

a random number generator at a server configured to generate a first random number, the random number is masked;

a prime number generator at the server configured to generate a prime number;

a first encryption module at the server configured to generate a first encrypted signal message by bundling a second message with at least one data signal from the first random number or the prime number;

a communication device configured to receive the first encrypted signal message from the server;

a first decryption module at the communication device configured to decrypt the first encrypted signal message and retrieve at least one of the first random number or prime number, the corresponding mask is removed;

a random number generator at the communication device configured to generate a second random number;

a signature signal generation module at the communication device configured to generate a signature signal;

a second encryption module at the communication device configured to generate a second encrypted signal message (y3) by using a hash function of a second random number (y2), a nonce value for security, and XoRing a cube of the first random number and y2, wherein cube of the first random number is equal to $[(r \bmod p)^3 \bmod p]$, and wherein p is a prime number;

bundling a third message with at least one data signal from the signature signal or the second random number;

a transceiver at the communication device configured to transmit the second encrypted signal message from the communication device to the server;

computing, by the server, the second random number by XoRing the second encrypted message with a cube of the first random number;

a second decryption module at the server configured to decrypt the second encrypted signal; and a validation module at the server configured to validate the second encrypted signal message by comparing at least one of corresponding signature values, hash values and nonce values of the server and the communication device.

11. The system of claim 10, wherein the first encryption module is configured to generate the first encrypted signal message by bundling the second message with at least one of the hash value associated with the masked random number, hash value associated with the random number, a public key and the nonce value associated with the random number.

12. The system of claim 10, wherein the second encryption module is configured to generate the second encrypted signal message by bundling the third message with at least one of the a private key, the corresponding signature signals associated therewith the private key and hash value of the second random number.

13. The system of claim 10, wherein the second decryption module is configured to retrieve the private key from the second encrypted signal message.

14. The system of claim 10, wherein validation module is configured to validate the second encrypted signal message by comparing either one of the corresponding value of a public key of the communication device, hash values or nonce values of the server and the communication device.

15. The system of claim 10, wherein the communication device is a wireless communication device enabled to operate using a 2G, 3G, or 4G communication protocol.

* * * * *